(12) United States Patent
Kim et al.

(10) Patent No.: US 6,344,884 B1
(45) Date of Patent: *Feb. 5, 2002

(54) LIQUID CRYSTAL DISPLAY DEVICE SUBSTRATE AND METHOD FOR MANUFACTURING THEREOF

(75) Inventors: Woong-Kwon Kim, Ahnyang-Shi; Jae-Beom Choi, Seoul; Sung-Sik Bae; Kwang-Jo Hwang, both of Anhyang-Shi, all of (KR)

(73) Assignee: LG.Philips LCD Co., Ltd., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/199,650

(22) Filed: Nov. 25, 1998

(30) Foreign Application Priority Data

Nov. 28, 1997 (KR) .............................. 97-64132

(51) Int. Cl.⁷ ..................... G02F 1/136; G02F 1/1333; G02F 1/13
(52) U.S. Cl. .................... 349/43; 349/138; 349/137; 349/122; 430/166
(58) Field of Search ......................... 349/42, 43, 187, 349/130, 122; 430/166; 251/59

(56) References Cited

U.S. PATENT DOCUMENTS

| | | | | |
|---|---|---|---|---|
| 5,523,865 A | * | 6/1996 | Furuta et al. ................. | 349/42 |
| 5,622,814 A | * | 4/1997 | Miyata et al. ............... | 349/139 |
| 5,721,601 A | * | 2/1998 | Yamaji ........................ | 349/138 |
| 5,821,138 A | * | 10/1998 | Yamazaki et al. .......... | 438/166 |

FOREIGN PATENT DOCUMENTS

| | | |
|---|---|---|
| JP | 02-074901 | 3/1990 |
| JP | 03-209435 | 9/1991 |
| JP | 08-017798 | 1/1996 |

* cited by examiner

*Primary Examiner*—Toan Ton
(74) *Attorney, Agent, or Firm*—Long Aldridge & Norman LLP

(57) ABSTRACT

A liquid crystal display according to the present invention uses an organic layer treated with $H_2$ plasma before fabricating an inorganic layer on the top of the organic layer. When forming thin film transistors (TFT) used in the LCD, an Indium Tin Oxide layer is fabricated above the TFTs and acts as a pixel electrode. When the organic layer, such as a passivation layer, is treated with the $H_2$ plasma, an intermediate layer having an O—H bonding structure is formed to enhance bonding or attachment of an inorganic layer, such as an ITO layer, to the organic layer.

15 Claims, 7 Drawing Sheets

LIQUID CRYSTAL DISPLAY DEVICE SUBSTRATE AND METHOD FOR MANUFACTURING THEREOF

BACKGROUND OF THE INVENTION

1. Field of the Invention

The present invention relates to a substrate of a liquid crystal display device (LCD), and a method for manufacturing the same. In particular, the present invention relates to a method for manufacturing a substrate of a liquid crystal display wherein an organic layer and a pixel electrode thereon are firmly cohering to each other.

2. Description of Related Art

A conventional substrate of a liquid crystal display device having a switching element and a pixel electrode is formed, mentioned as follows, referring to FIGS. 1a and 1b. FIGS. 1a and 1b show the inverse staggered structure of the thin film transistor (TFT).

Referring to FIG. 1a, a gate electrode 60a is formed on a transparent substrate 10. A gate insulation layer 50 is deposited thereon to cover the gate electrode 60. A semiconductor layer 90 with an island shape is formed on the gate insulation layer 50 on the gate electrode 60. On the surface of the semiconductor layer 90, ohmic contact layers 92a and 92b are formed in separate regions. On one ohmic contact layer 92a, a source electrode 70a is formed and a data line 70 connecting to the source electrode 70a is formed on the gate insulation layer 50. On the other ohmic contact layer 92b, a drain electrode 70b is formed. As the gate electrode, source electrode and the drain electrode are formed, a TFT acting as a switching element is completed.

On the substrate having the TFT, an organic layer 55, including a benzocyclobutene (or BCB) generally containing combinations of C, H and O elements, is formed. A contact hole 30 is formed to expose some surface of the drain electrode 70b by patterning the organic layer 55. The reason for using the organic layer on the substrate of the LCD is that after being coated on the substrate of which surface has stepped profile, the surface of the organic layer does not project the stepped profile. That is, a substantially flat surface of the organic layer is formed. Also, the organic layer has a lower coefficient constant similar to the inorganic layer, such as silicon oxide ($SiO_x$) or silicon nitride ($SiN_x$). Therefore, after the organic layer is formed on the substrate, a pixel electrode can be formed over the area on which the data line is formed in order to maximize the aperture ratio. In that regard, an ITO (Indium Tin Oxide) layer is deposited on the organic layer having the contact hole 30 and is patterned to form a pixel electrode 40 by etching the ITO layer with the photo-resist 88 pattern using a wet etching method. It is possible to overlap the pixel electrode and some portion of the data line because problems such as cross talk do not occur between them due to the characteristics of the organic material mentioned above.

However, during the etching process, the ITO layer can be easily peeled off from the organic layer or a vacancy can occur between the ITO layer and the organic layer because the coherency between them is very weak. As a result, the etchant can penetrate into the vacancy so that the pixel electrode can be over etched, as shown in FIG. 1b. FIG. 1b shows the undesirable patterned results which (A) is the peeled off portion of the pixel electrode (B) and (C) are the over etched portion of the pixel electrode.

If the edge portions of the ITO layer, which constitutes the pixel electrode, are over etched by the etchant, then the size of the pixel electrode is reduced and becomes irregular. This is referred to as a CD loss. As a result, the aperture ratio becomes smaller than the expected value.

SUMMARY OF THE INVENTION

In order to overcome the above-mentioned problem, an object of the present invention is to suggest a method for manufacturing a substrate of the LCD in which the coherence between the pixel electrode and the organic layer is enhanced as well as the structure of the LCD by the same method. Another object is to protect the pixel electrode from being over etched by enhancing the coherence of the pixel electrode with the organic layer.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

The present invention suggests a method in which an intermediate thin layer 156 is formed by treating the surface of the organic layer 155 with plasma of $H_2$, as shown in FIG. 2a. The organic layer typically comprises C, H, and O radicals. As a result, the surface of the organic layer has an unstable state. The present invention suggests an enhanced method for making the surface of the organic passivation layer more stable by treating it with plasma containing H element. Consequently, the pixel electrode fabricated on the treated region has stronger adherence and maintains its shape and size. When the surface of the organic layer is treated with the $H_2$ plasma, the surface has an O—H bonding structure. Therefore, as an ITO layer or a metal layer is deposited thereon, the coherence of it on the organic layer is enhanced. As a result, it is possible to protect the inorganic layer, such as an ITO layer or an metal layer deposited on the organic layer, from being peeling off and being undesirably patterned.

According to this scope, the present invention suggests an LCD comprising a substrate, a TFT on the substrate, an organic layer covering the TFT, an intermediate layer 180, as shown in FIG. 2b is formed by treating the surface of the organic layer with $H_2$ plasma, a contact hole exposing a surface of a drain electrode of the TFT by removing some portion of the organic layer and the intermediate layer, a pixel electrode connecting to the drain electrode through the contact hole. The present invention also suggests an LCD according to the above-mentioned structure wherein the intermediate layer is further formed on the side wall of the contact hole.

Additionally, the present invention suggests a method for manufacturing an LCD comprising steps of forming a TFT on a substrate, forming an organic layer covering the TFT, treating the surface of the organic layer with $H_2$ plasma, forming a contact hole exposing some surface of the drain electrode by removing some of the organic layer and intermediate layer, forming a pixel electrode connecting to the drain electrode through the contact hole. The present invention also suggests a method for manufacturing an LCD according to the above-mentioned method wherein the step of forming a contact hole is performed after forming the organic layer, and then the step of treating the surface of the organic layer is performed so that the side wall of the contact hole also has the intermediate layer on the surface.

These and other aspects, features and advantages of the present invention will be better understood by studying the

BRIEF DESCRIPTION OF THE ATTACHED DRAWINGS

A detailed description of embodiments of the invention will be made with reference to the accompanying drawings, wherein like numerals designate corresponding parts in the several figures.

DETAILED DESCRIPTION OF THE PREFERRED EMBODIMENTS

Figure 1A:
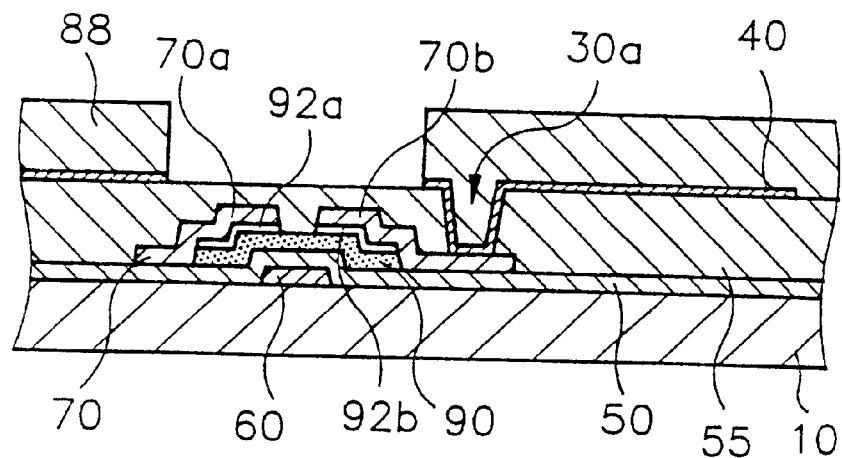
FIGS. 1a and 1b are cross-sectional views illustrating the conventional substrate of a liquid crystal display.
Figure 1B:
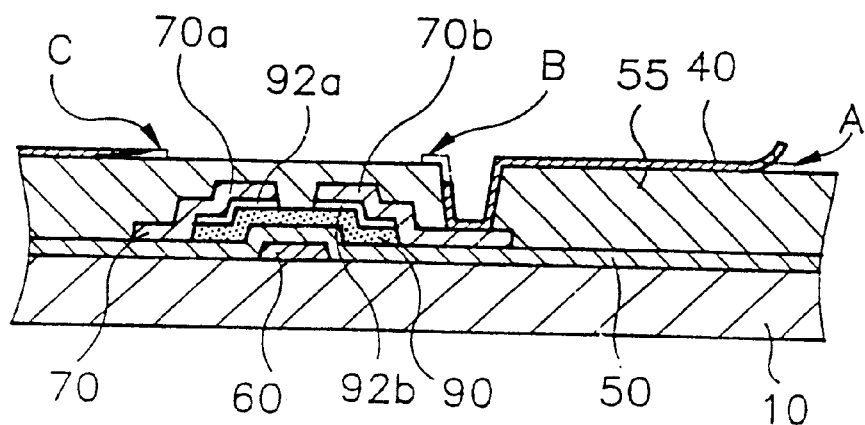
Figure 2A:
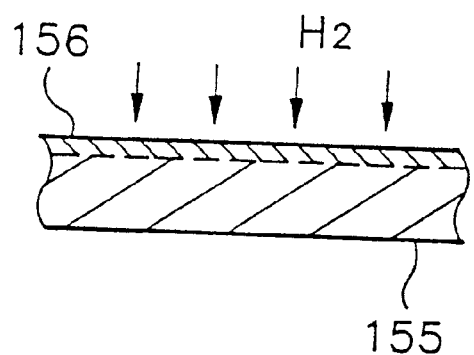
FIGS. 2a and 2b are cross-sectional views showing the present invention.
Figure 2B:
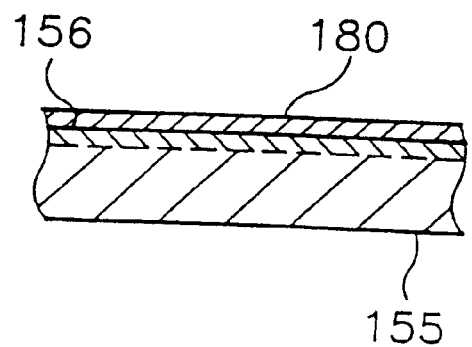

Referring to the figures and preferred embodiments, we will explain about the present invention in detail. Referring to the FIGS. 3a–3d, the first preferred embodiment is explained as follows.

As described above, a gate electrode 160 is formed on a transparent substrate 110. A gate insulation layer 150 is deposited thereon to cover the gate electrode 160. A semiconductor layer 190 with an island shape is formed on the gate insulation layer 150 on the gate electrode 160. On the surface of the semiconductor layer 190, ohmic contact layers 192a and 192b are formed in separate regions. On one ohmic contact layer 192a, a source electrode 170a is formed and a data line 170 connecting to the source electrode 170a is formed on the gate insulation layer 150. On the other ohmic contact layer 192b, a drain electrode 170b is formed. As the gate electrode, source electrode and the drain electrode are formed, a TFT acting as a switching element is completed.

Figure 3A:
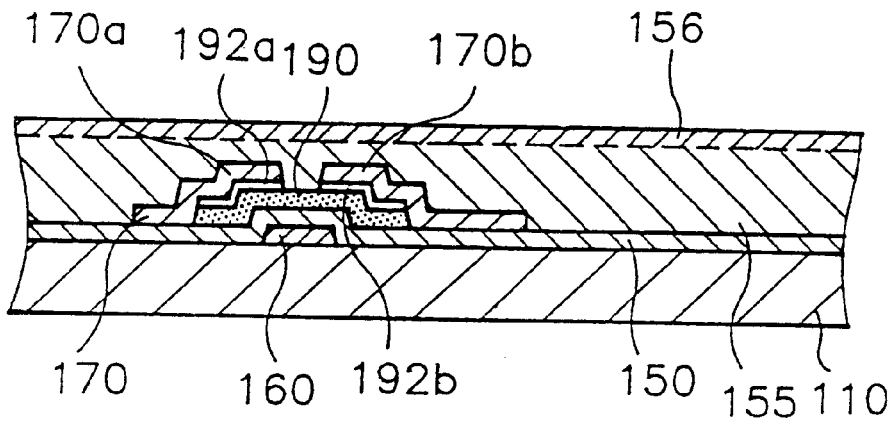
FIGS. 3a–3d, 4a–4c, 5 and 6 are cross-sectional views illustrating the substrate of a liquid crystal display according to the present invention.

An organic layer 155 including one of BCB, Fluorinated polyimide, Teflon, Cytop and Acrylic Resin is formed on the substrate layers having the TFT preferably by a spin coating method. Alternatively, any other methods known to one of ordinary skill in the art may be used to apply the organic layer 155 to the substrate. Then, the surface of the organic layer 155 is treated with $H_2$ plasma so that an intermediate layer 156 having an O—H bonding structure is formed, as shown in FIG. 3a.

Figure 3B:
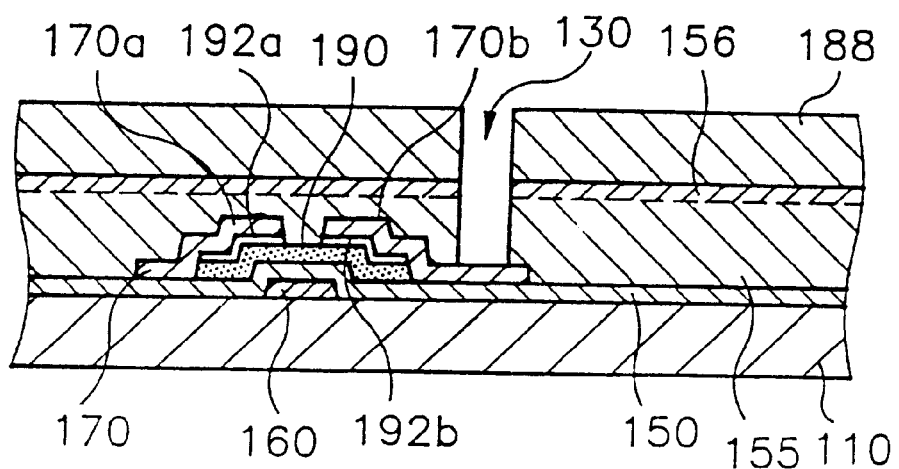

After a photo resist 188 is coated on the whole surface having the intermediate layer 156 in the O—H bonding structure, the photo resist 188 is developed in a certain pattern to form a contact hole 130 exposing some surface of the drain electrode 170b. Then the intermediate layer 156 and the organic layer 155 covering the exposed portion of the drain electrode are removed preferably by a dry etching method to form a contact hole 130, as shown in FIG. 3b.

Figure 3C:
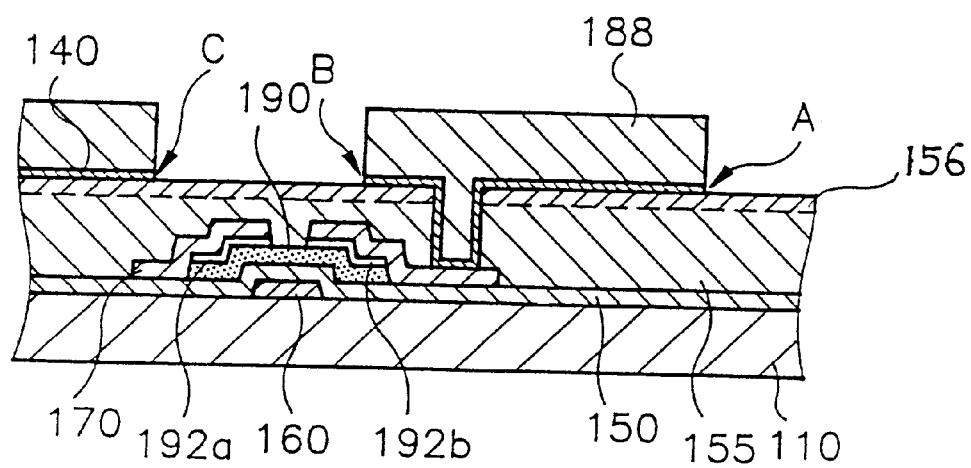
Figure 3D:
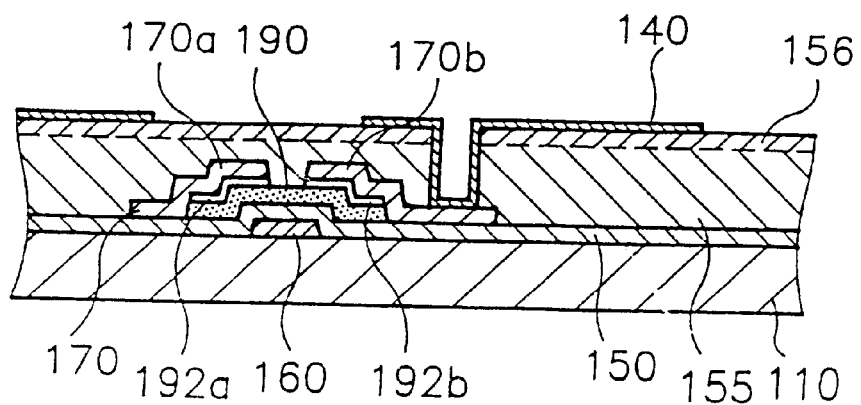

After all of the photo resist 188 is removed, an ITO layer 140 is deposited on the whole surface of the substrate preferably by a sputtering method. Then, another layer photo resist 188 is coated thereon. After the photo resist 188 is developed in a certain pattern, the ITO layer 140 is patterned preferably by a wet etching method, as shown in FIG. 3c. According to this embodiment, the coherence of the organic layer 155 and the ITO layer 140 is enhanced because the intermediate layer 156 enhances the adhesion between them. Therefore, the etchant cannot penetrate into regions represented as (A),(B) and (C) in FIG. 3c.

Thereafter, a pixel electrode 140, the ITO layer formed on the intermediate layer 156 in O—H bonding structure, is patterned without being peeled off or over etched.

Figure 4A:
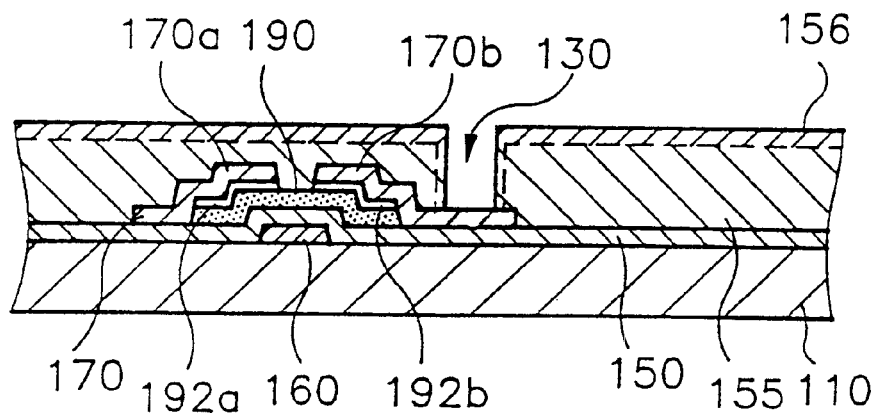
Figure 4B:
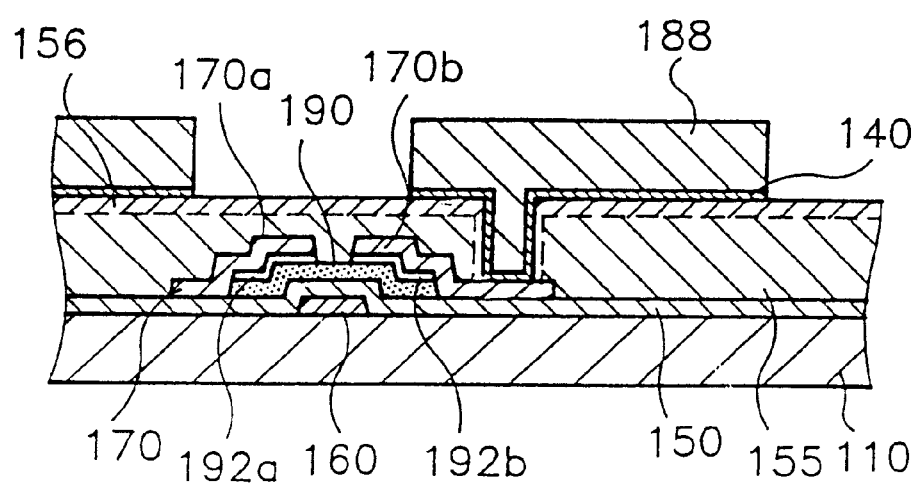
Figure 4C:
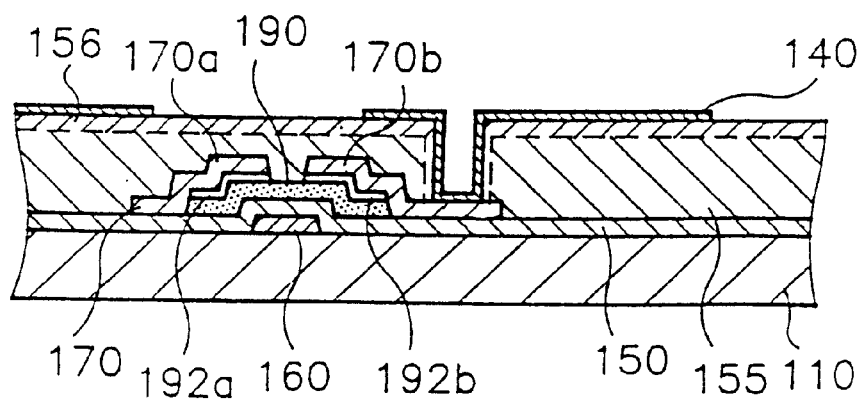

Referring to FIGS. 4a–4c, the second embodiment of the present invention is explained as follows. As the gate electrode, source electrode and the drain electrode are formed on a substrate 110, a TFT acting as a switching element is completed, as mentioned in the first preferred embodiment. An organic layer 155 including one of BCB, Fluorinated polyimide, Teflon™, Cytop and Acrylic Resin all containing oxygen element is formed on the substrate having the TFT preferably by a spin coating method. And the organic layer 155 covering the exposed portion of the drain electrode is removed preferably by a dry etching method to form a contact hole 130. Then, the surface of the organic layer 155 is treated with $H_2$ plasma so that an intermediate layer 156 having O—H bonding structure is formed. According to the second embodiment, the side wall of the contact hole 130 is also coated with the intermediate layer 156 having the O—H bonding structure, as shown in FIG. 4a. The exposed drain electrode 170b is not damaged by the etchant at all because the drain electrode 170b is made of metal such as aluminum or chromium.

An ITO layer 140 is deposited on the whole surface of the substrate preferably by a sputtering method. Then, another photo resist 188 is coated thereon. After the photo resist is developed in a certain pattern, the ITO layer 140 is preferably patterned by a wet etching method, as shown in FIG. 4b.

After the etching step is finished, all of the photo resist is removed and the substrate of the LCD is completed. According to this embodiment, the coherence of the organic layer 155 and the ITO layer 140 is enhanced because the intermediate layer 156 enhances the adhesion between them.

Figure 5:
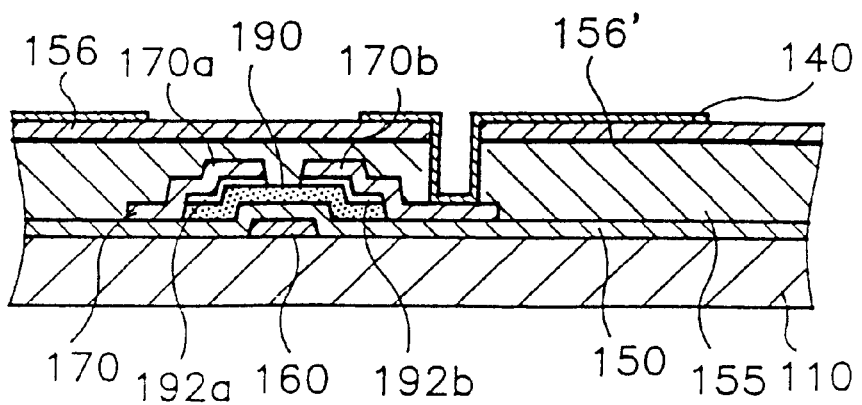

Referring to FIG. 5, the third embodiment of the present invention comprises a step of forming an oxide intermediate layer 156' by treating the organic layer 155 with $O_2$ plasma before forming the intermediate layer 156 using $H_2$ plasma treatment as described in the first embodiment.

Treated with $O_2$ plasma, the surface of the organic layer 155 is changed into a silicon oxide ($SiO_x$) layer referred herein as the oxide intermediate layer 156', so that the surface becomes stable. However, the oxide intermediate layer 156' may still contain some unstable regions. After being treated again with $H_2$ plasma, the surface of the silicon oxide layer is changed into an intermediate layer 156 having an O—H bonding structure.

In the third embodiment, the method for manufacturing the LCD is similar to the first embodiment, except that one of the differences is the step of treating the organic layer 155 with $O_2$ plasma before treating with $H_2$ plasma.

Figure 6:
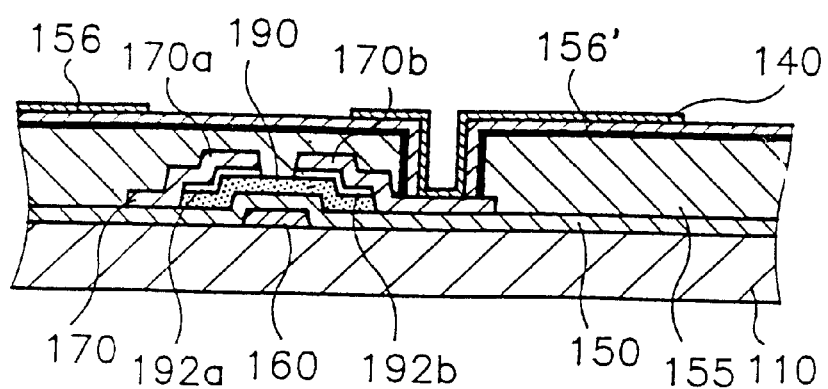

Referring to FIG. 6, the fourth embodiment of the present invention comprises a step of forming an oxide intermediate layer 156' by treating the organic layer 155 with $O_2$ plasma before forming the intermediate layer 156 using $H_2$ plasma treatment as described in connection with the second embodiment.

A contact hole 130 is formed just after the organic layer 155 is formed. Treated with $O_2$ plasma, the surface of the organic layer 155 is changed into a silicon oxide ($SiO_2$) layer, the oxide intermediate layer 156'. After being treated again with $H_2$ plasma, the surface of the silicon oxide layer is changed into an intermediate layer 156' having an O—H bonding structure. According to the fourth embodiment, the side wall of the contact hole 130 also has the oxide intermediate layer 156' including the silicon oxide layer and the intermediate layer 156' in an O—H bonding structure.

In the third and fourth embodiments, it is preferable to replace the $O_2$ plasma with Ar plasma. Also, the $H_2$ plasma treatment may be performed before treating the surface with the O₂ plasma or Ar plasma.

The present invention suggests a method for manufacturing the LCD panel comprising a step of treating the organic layer with H₂ plasma for enhancing the coherence force with an inorganic layer such as an ITO layer thereon. Treated with H₂ plasma, the surface of the organic layer transforms into an intermediate layer having an O—H bonding structure.

The intermediate layer coheres with the inorganic layer such as an ITO, silicon nitride (SiNx) or silicon oxide (SiOx), or the metal layer such as Al, Cr, Mo, W or Ta, very well.

Therefore, according to the scope of the present invention, it is possible to prevent an inorganic layer from being peeled off or over etched by a penetrating etchant.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for manufacturing a pixel element of a liquid crystal display device, comprising the steps of:

providing a substrate;

forming a first layer over the substrate;

first treating the surface of the first layer with plasma containing at least one of oxygen and argon;

second treating at least part of the first layer with plasma containing hydrogen to form an intermediate layer; and forming a second layer over the intermediate layer.

2. A method of claim 1, wherein the first layer comprises at least one of Bezocylobutene (BCB), Fluorinated polyimide, Teflon, Cytop and Acrylic Resin.

3. A method of claim 1, wherein the second layer comprises at least one of indium tin oxide (ITO), silicon nitride (SiN$_x$) and silicon oxide(SiO$_x$).

4. A method of claim 1, further comprising a step of forming an additional intermediate layer by treating the first layer with plasma containing at least one of oxygen and argon between the first layer and the intermediate layer.

5. A method of claim 1, further comprising a step of forming an additional intermediate layer by treating the intermediate layer with plasma containing at least one of oxygen and argon between the intermediate layer and the second layer.

6. A method of claim 1, wherein the second layer includes an inorganic material.

7. A method according to claim 1, wherein the intermediate layer has an O—H bonding structure.

8. A method of claim 1, wherein the first layer is comprised of an organic material.

9. A method of manufacturing a liquid crystal display device, comprising the steps of:

providing a substrate;

fabricating a switching element formed on the substrate, the switching element having at least one electrode;

forming an organic layer covering at least part of the substrate having the switching element;

first treating the surface of the first layer with plasma containing at least one of oxygen and argon;

second treating at least a portion of the organic layer with plasma containing hydrogen;

exposing the at least one electrode of the switching element by removing at least a portion of the organic layer and the intermediate layer covering the electrode; and forming an inorganic layer connected to the at least one electrode on the intermediate layer.

10. A method of claim 9, wherein the organic layer comprises at least one of Bezocylobutene (BCB), Fluorinated polyimide, Teflon, Cytop and Acrylic Resin.

11. A method of claim 9, wherein the inorganic layer is a conductive layer.

12. A method of claim 11, wherein the conductive layer comprises Indium Tin Oxide.

13. A method of claim 11, further comprising a step of treating the surface of the organic layer with plasma containing at least one of oxygen and argon after treating with the plasma containing hydrogen.

14. A method of claim 11, wherein the treating the organic layer with the plasma containing hydrogen before the contact hole is formed.

15. A method according to claim 9, wherein the treated portion of the organic layer has an O—H bonding structure.

* * * * *